March 15, 1938. W. S. HARLEY 2,111,242
LUBRICATING SYSTEM FOR INTERNAL COMBUSTION ENGINES
Filed May 16, 1936 3 Sheets-Sheet 1
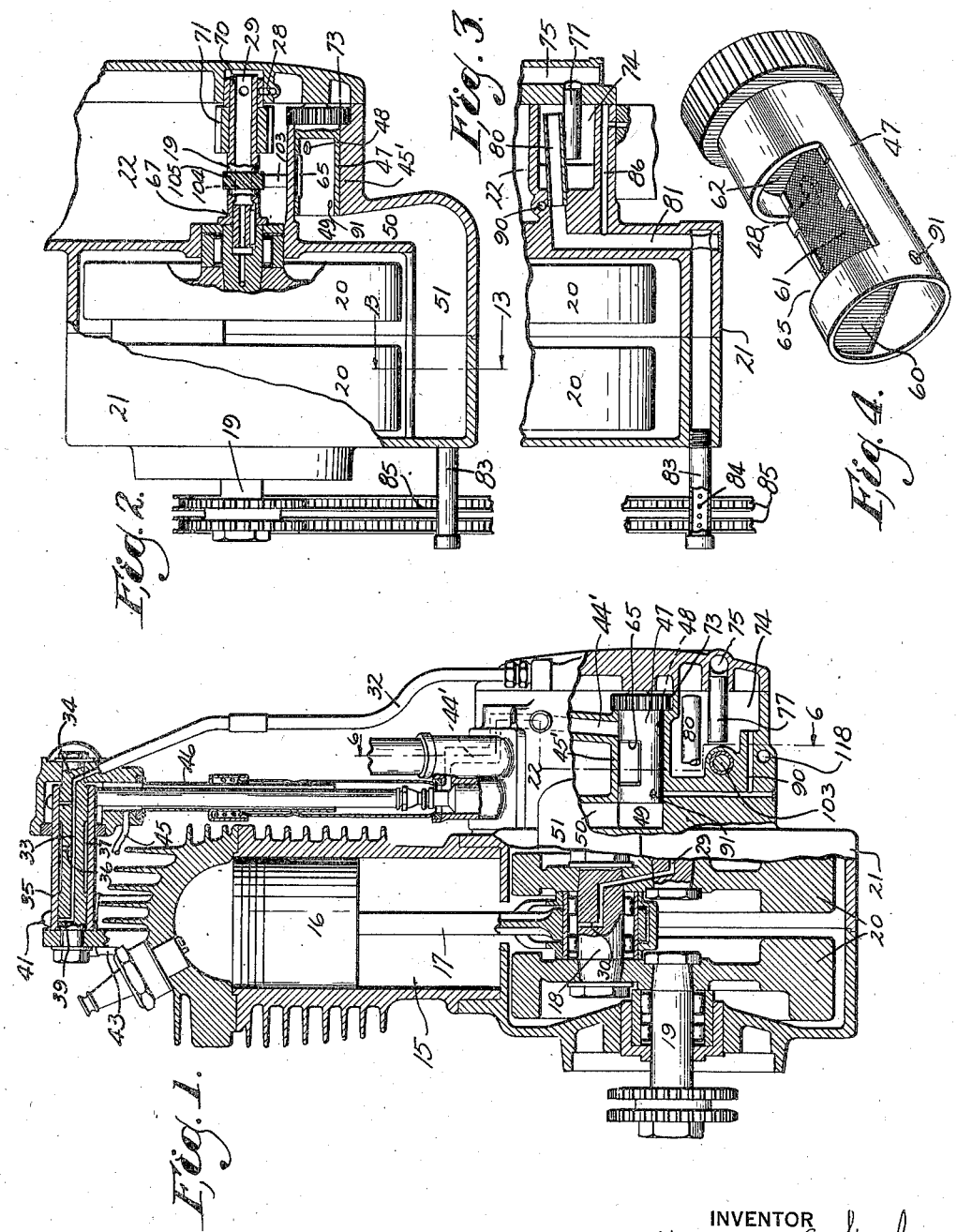
INVENTOR
William S. Harley
BY
Wheeler, Wheeler + Wheeler
ATTORNEYS March 15, 1938.  W. S. HARLEY  2,111,242
LUBRICATING SYSTEM FOR INTERNAL COMBUSTION ENGINES
Filed May 16, 1936  3 Sheets-Sheet 2
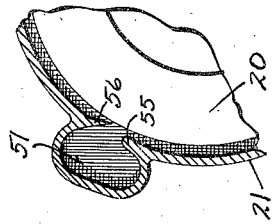
Fig. 13.
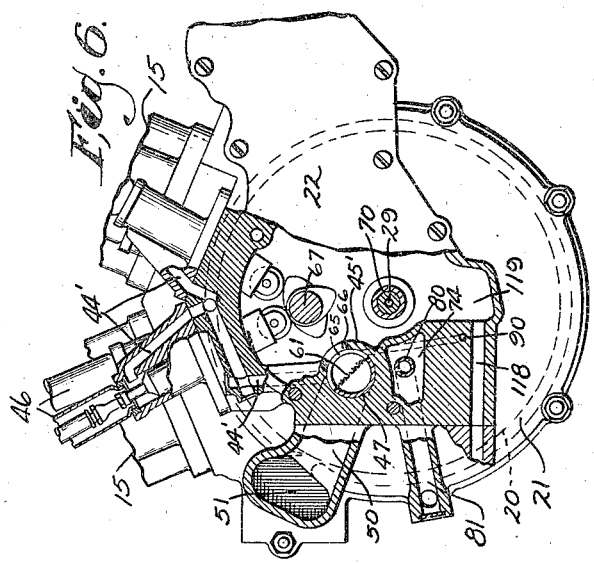
Fig. 6.
Fig. 5.
INVENTOR
William S. Harley,
BY
Wheeler, Wheeler + Wheeler
ATTORNEYS

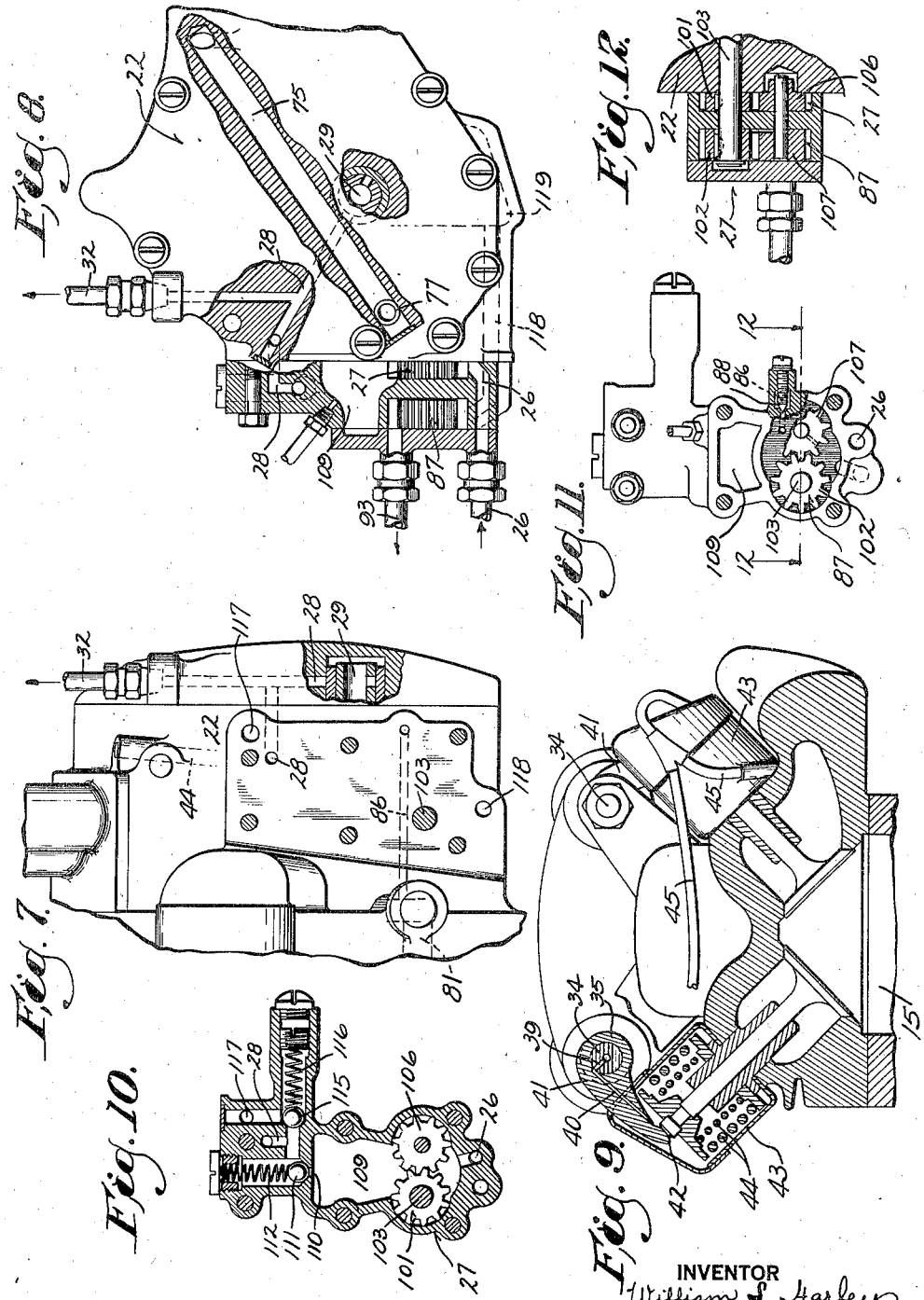

Patented Mar. 15, 1938

2,111,242

UNITED STATES PATENT OFFICE 2,111,242

LUBRICATING SYSTEM FOR INTERNAL COMBUSTION ENGINES

William S. Harley, Milwaukee, Wis., assignor to Harley-Davidson Motor Co., Milwaukee, Wis., a corporation of Wisconsin Application May 16, 1936, Serial No. 80,037

36 Claims. (Cl. 184—6)

My invention relates to improvements in lubricating systems for internal combustion engines, with particular reference to the lubrication of motorcycle engines.

A general object is to provide an improved circulatory and force feed lubricating system peculiarly suited to the requirements of motorcycle engines, but having a much wider range of usefulness and adaptation.

More specific objects are to provide a lubricating system having an elevated sump associated with the crank case and with a trap valve adapted to be opened and closed in correspondence with variations in pressure within the crank case; to provide such a valve with an internal chamber and a separating screen through which oil, vapor, and particles of oil, may be blown into the gear case during periods of crank case compression; to provide means for adequately lubricating the rocker arm assembly and returning excess lubricant through the trap valve to the gear case; to provide means for returning excess lubricant from the gear case to the source of supply, and also delivering air and vaporized lubricant to a separating chamber in communication with a vent nozzle for delivering lubricant to the chain in the form of a fine mist or spray; to provide means for withdrawing separated liquid lubricant from the separating chamber and delivering it through the trap valve to the gear case; and to provide means for timing the rotation of the trap valve with reference to variation in pressure within the crank case.

A further object is to provide an improved method of lubricating and cooling the bearings of internal combustion engines by circulating, cooling and recirculating excessive quantities of lubricant over the working portions in a substantially closed circulatory system.

In the drawings:

Figure 1 is an elevation of a motorcycle engine embodying my invention, with parts broken away in vertical section, exposing the crank shaft, the rotary trap valve, and the separating chamber, the crank shaft and crank being also partially broken away to expose the lubricating duct therein.

Figure 2 is a view, partly in plan and partly in horizontal section, exposing the fly wheels in their relation to the elevated sump and trap valve, a fragment of the crank shaft being also shown in horizontal section.

Figure 3 is a fragmentary view in horizontal section showing the separating chamber, a fragment of the pump assembly in association therewith, and the vent duct and nozzle in association with a fragment of the chain.

Figure 4 is a detail perspective view of the trap valve.

Figure 5 is a view taken at right angles to Figure 1, with a portion of the wall of the gear case broken away.

Figure 6 is a view of the crank case and gear case assembly, partly in elevation and partly in vertical section, drawn generally to line 6—6 of Figure 1.

Figure 7 is a detail view showing the pump supporting portion of the gear case, with the pump removed, and part of the gear case cap in section.

Figure 8 is a fragmentary view of the right hand side of the parts illustrated in Figure 7, with portions broken away in vertical section.

Figure 9 is a fragmentary view of the intake and exhaust valve assembly, partly in elevation and partly in section, drawn to a plane through one of the rocker arms and the spring housing of one of the valves.

Figure 10 is a vertical sectional view of the feed pump and associated valves.

Figure 11 is an elevation of the scavenging pump, partly broken away to expose the needle valve controlling the supply of liquid lubricant to the chain lubricating nozzle.

Figure 12 is a view of the feed and scavenging pump assembly in horizontal section.

Figure 13 is a sectional view of the sump taken on line 13—13 of Figure 2.

Like parts are identified by the same reference characters throughout the several views.

The drawings illustrate a motorcycle engine in which cylinders 15 (Figures 1 and 5), with their pistons 16, connecting rods 17, cranks 18, crank shaft 19, fly wheels 20,—together with the crank case 21, gear case 22 and associated timing gears, cam shaft, tappet rods, and the rocker arm and valve assembly may all be assumed to be of ordinary construction, except as modified to adapt them to my improved lubricating system as hereinafter described.

The lubricant is stored in a suitable tank or reservoir 25 (Figure 5), from which it is withdrawn through a pipe 26 by means of a pump 27 (Figures 5 and 12), which delivers it to a duct 28, crank shaft duct 29 (Figure 2), and branch duct 30 in the crank 18 (Figure 1). The main bearings of the crank shaft 19 may receive splashed lubricant from the crank case.

From the pump, lubricant is also delivered upwardly through a duct 32 to an axial duct 33 in the fixed shaft 34 upon which the rocker arm sleeve 35 is journaled. A radial branch duct 36 delivers the lubricant to an annular cavity 37 encircling the central portion of said fixed shaft 34. Branch ducts 39 lead through the end portions of sleeve 35 and communicate with ducts 40 in the respective rocker arms 41 (Figure 9). These ducts deliver lubricant to the tappet bearings 42, and the excess lubricant enters the cups 43 which house the valve springs 44.

The lubricant drains from these cups 43, preferably through ducts 45 which lead to the tappet rod housing tubes 46 (Figure 1), or other suitable conduits connected by a duct 44' with the casing 45' of a rotary cylindrical trap valve 47 (Figures 1, 4, and 6). Delivery from the duct 44' to the interior of the trap valve 47 is accomplished once during each revolution of the trap valve when its port 48 is brought in registry with the outlet of duct 44', where it enters the trap valve casing 45'.

The rotary trap valve 47 has an open end in communication with the crank case through a cavity 49 at the inner end of the trap valve casing 45' and through a duct 50 connected with an elevated sump 51 (Figures 1, 2, 5, and 6). This sump 51 is located in a lateral extension of the side wall of the crank case and is in communication with the upper portion of the crank case on the side along which the crank ascends. During the operation of the engine, lubricant is swept upwardly from the bottom portion of the crank case 21 by the fly wheels 20 and thrown by centrifugal force into the sump over the arcuate wall 55 interposed between the bottom portion of the sump and the crank case cavity. This lubricant is delivered downwardly through the duct 50 to the end portion 49 of the trap valve casing 45' and is blown into the trap valve during periods of compression in the crank case. Preferably the wall 55 recedes slightly from the fly wheel, and the overhanging wall 56 has a finished or knife edge in close proximity to the fly wheel to scrape drops of oil from its periphery.

The open inner end of the trap valve 47 is partially closed by a wall 60 (Figure 4), and a screen 61 extends from this wall to a corresponding wall 62 near the opposite end of the valve, said screen extending over a large outlet port 65 formed by cutting away substantially one-half of the wall of the valve on the outlet side of the central portion of the screen 61. During each revolution of the valve this port 65 is brought into registry with a port 66 in the valve casing, which permits an oblique upward delivery of such lubricant as is blown through the screen 61, including both liquid and vaporized lubricant. As shown in Figure 6, this lubricant is delivered to the cam shaft 67 and associated parts in the gear housing, and it is sufficiently distributed throughout the gear housing to provide adequate lubrication to the gears. As shown in Figure 5, motion is transmitted from the crank shaft extension 70 to the rotary valve 47 through the pinion 71, gear wheel 72, and the pinion 73 on the outer end of the trap valve 47. Gear wheel 72 is secured to the cam shaft 67.

Air and vaporized lubricant is delivered from the gear chamber downwardly into the separating chamber 74 through an oblique duct 75, preferably formed in the gear chamber cap 22, with its lower end in communication with the horizontally disposed pipe 77 extending into the separating chamber. This delivery occurs when the trap valve 47 places the gear chamber in communication with the crank chamber during compression periods. The trap valve being actuated from the driving cam shaft gear 72, the registry of the trap valve main outlet with the port 65 will be properly timed. There being two compression periods for each revolution of the cam shaft, the pinion 73 is made one-half the diameter of the gear wheel 72.

The air with its entrained oil and vapor which passes downwardly through the duct 75 into the separating chamber is blown through the nozzle pipe 77 against the opposite wall of the chamber (Figure 3), and a portion of the liquid lubricant, including vapor which condenses on said wall, is separated and drops to the floor of the separating chamber. The remainder returns to the cap wall for further condensation and the residue enters the outlet pipe 80 which delivers it to a duct 81 in the crank case wall which leads to a laterally projecting nozzle 83 having small distributing ports 84 for jet delivery to the power transmitting chain 85. In a motorcycle, this chain drives the traction wheel.

If the supply of lubricant for chain 85 should be deficient, added lubricant may be delivered to the duct 81 through a duct 86, the inlet end of which is connected with a return circulation or scavenging pump 87 hereinafter described. An adjustable throttle valve, preferably a needle valve 88, controls delivery from the pressure side of the pump 87 to the duct 86.

Liquid lubricant settling to the bottom of the separating chamber may be returned to the trap valve through the duct 90 and valve port 91 during suction periods when the engine pistons are ascending and the pressure in the crank case is below atmospheric. During the same period, but not necessarily at the same time, valve port 48 registers with duct 44' and extends the suction to the cups 43. At such times the main outlet port 65 of the rotary trap valve 47 is closed.

Excess liquid lubricant accumulating in the bottom of the gear case is drawn off by means of the return circulation or scavenging pump shown in Figure 11 and returned to the reservoir 25 through the pipe 93. The upper portion of the reservoir 25 is preferably in communication with the gear case through a vent pipe 92, whereby the pressure in the reservoir and gear case may be equalized.

The pump assembly is best illustrated in Figures 10, 11, and 12.

Rotary gear pumps are preferably employed for both the force feed and return side of the circulatory system. The force feed pump 27 (Figure 10) and return circulation pump 87 (Figure 11) have their respective driving gears 101 and 102 mounted on a shaft 103 (Figure 12), which has a beveled spiral gear 104 in mesh with a spiral pinion 105 (Figure 2) fixed to the crank shaft extension 70. The pump gears 106 and 107 of the pumps are driven from the gears 101 and 102, respectively.

Feed pump 27 has a priming chamber 109 (Figure 10). Its outlet port 110 is normally closed by a ball valve 111, urged to its seat by a spring 112 and the pressure of the oil above it. From the outlet side of this valve, the lubricant is delivered through duct 28 to the crank shaft, and through branch duct 32 to the rocker arms. Excess lubricant, if sufficient to develop pressure enough to open valve 115 against the resistance of spring 116, will be by-passed to the gear chamber through duct 117 and returned to the reservoir through duct 118, pump 87, and the duct 93 which leads to the reservoir, (Figures 5 and 8). Duct 118 is in communication with a gear chamber sump 119 (Figure 6).

From the foregoing description it will be apparent that an adequate supply of lubricant can be delivered by the feed pump to all parts of the engine subject to wear, final distribution to the gear chamber and to the chain during periods of compression in the crank case being governed by the trap valve 47, which, during suction periods, also aids in withdrawing excess lubricant from the rocker arm assembly and the separating chamber 74. All excess lubricant accumulates in the gear case sump 119 and is returned to the reservoir by the pump 87.

It will be understood that the rotary trap valve receives lubricant from the sump during periods of compression in the crank case. During periods of partial vacuum in the crank case the outlet port 65 of this valve is closed, and therefore neither lubricant nor air will be returned from the gear case to the crank case. But at these times the ports 48 and 91 will be successively opened for brief periods to draw lubricant from the valve assembly and separating chambers.

In the operation of a motorcycle embodying my invention, I am able to constantly deliver to the bearings a supply of lubricant several times greater than has heretofore been thought practical, with no excessive accumulation in the crank and gear chambers, and no external distribution, waste, or drip. Due to the constant circulation of this large supply of lubricant the bearings are kept cool and in substantially perfect working condition. The reservoir may serve as a heat radiator and may be large enough to allow the recirculated lubricant to be cooled and mixed with the supply before it is returned to the engine bearings.

I claim:

1. A motorcycle engine having crank and gear chambers subject to varying air and gas pressures in correspondence with piston movements, in combination with means for delivering lubricant to the crank bearings, means for utilizing piston developed pressures in the crank chamber for driving lubricant and lubricant laden air into the gear chamber, and an engine operated valve timed to prevent the return of such lubricant and air to the crank chamber during periods of piston suction.

2. A motorcycle engine having crank and gear chambers subject to varying air and gas pressures in correspondence with piston movements and also having an overhead valve mechanism, of engine driven means for delivering lubricant to the crank bearings and valve mechanism, and means for utilizing the higher air and gas pressures developed in the crank chamber to distribute the excess lubricant and lubricant laden air to the bearings in the gear case, said means being also adapted to provide for withdrawal of excess lubricant from the valve mechanism during periods of low pressure in the crank chamber.

3. The combination with an internal combustion engine having crank and gear chambers, of a crank case wall provided with an elevated sump on the ascending side of the crank, said sump being connected for drainage into the gear chamber, and a power driven lubricant distributing valve in said drainage connection, said valve being timed to open and close in correspondence with periods of maximum and minimum pressure in the crank case and controlling the drainage from said sump by closing said connection during periods of minimum pressure in the crank case.

4. The combination with an internal combustion engine having crank and gear chambers, of means for delivering lubricant to the crank bearings and to parts of the valve assembly subject to wear, a trap valve adapted to open and close in timed relation to the strokes of the engine piston, and means for utilizing pulsating pressures developed by the piston to cause delivery of excess lubricant from the valve assembly and crank chamber to the trap valve and through it to the cam shaft and timing gears in the gear chamber.

5. The combination with an internal combustion engine, of means for delivering lubricant to the engine bearings and to parts of the valve assembly subject to wear, a trap valve adapted to open and close in timed relation to the stroke of the engine piston, and means for utilizing pulsating pressures developed by the piston to regulate delivery of excess lubricant to the trap valve and through it to the cam shaft and timing gears, said trap valve also having associated means for condensing and separating portions of the entrained liquid and vaporized lubricant from air and exhaust gases entering the valve from the crank case and delivering such air and gases to the power transmitting connections of the engine.

6. A lubricating system for internal combustion engines, including the combination with a source of supply, of means for feeding lubricant to overhead bearings, collecting cups connected to return excess lubricant along the tappet rods to the gear case, a power driven valve adapted to utilize crank case suction and compression to assist in returning the excess lubricant to the gear case for separation of air therefrom, said gear case having an air duct leading to the exterior from its upper portion and pumping mechanism for withdrawing liquid lubricant from the gear case and delivering it to the source of supply.

7. In a mechanism of the described class, having a chamber housing some of the working parts of said mechanism and subject to periodical variations in pressure, the combination with such chamber, of a valve controlling deliveries of air and entrained lubricant from said chamber to working parts of the mechanism, and means for timing the movements of such valve for delivery of lubricant during periods of high pressure in said chamber, said valve being also ported for communication with other portions of said mechanism during periods of low pressure in said chamber, whereby lubricant may be withdrawn from said other portions of the mechanism by suction.

8. In an internal combustion engine having a valve mechanism controlling delivery of combustible material to the engine and also having a crank case subject to periods of alternating compression and partial vacuum in correspondence with movements of the engine piston, the combination with the valve mechanism, of means for feeding lubricant to the working parts thereof, means for collecting excess lubricant therefrom, means for utilizing suction in the crank case to periodically withdraw such excess lubricant, said lubricant withdrawing means including a valve having a cavity in communication with the crank case, an outlet port in communication with a lubricant collecting chamber, and a port through which suction may be extended to withdraw lubricant from said collecting means.

9. In an internal combustion engine having a cylinder provided with inlet and outlet valves and mechanism for operating said valves at timed intervals, of means for delivering lubricant under pressure to said mechanism and collecting excess lubricant therefrom, and means for utilizing variations in pressure within the crank case to periodically withdraw the lubricant so collected and deliver it to other portions of the engine.

10. In an engine lubricating system, the combination with a chamber subject to alternate periods of compression and partial vacuum, of a redistributing trap valve having a cavity in communication with said chamber, and an outlet port for delivery of lubricant laden air to working portions of the engine, means for actuating said valve to periodically open and close said outlet port, and means for lifting lubricant from said chamber and storing it for delivery through said valve during periods of compression, said valve actuating means being adapted to close the valve during periods of partial vacuum to prevent return of such lubricant laden air.

11. In an engine lubricating system, the combination with a chamber subject to alternate periods of compression and partial vacuum, of a redistributing trap valve having a cavity in communication with said chamber, and an outlet port for delivery of lubricant laden air to working portions of the engine, means for actuating said valve to periodically open and close said outlet port, and power driven means for returning excess lubricant to a source of supply.

12. In a lubricating system for internal combustion engines, the combination of a crank chamber, a gear chamber, and an intake and exhaust valve assembly, a lubricant reservoir, a pump for delivering lubricant from the reservoir to the working parts in the crank chamber and valve assembly, a power driven valve having a cavity in communication with the crank chamber to receive excess lubricant therefrom, said valve being also ported to receive excess lubricant from the valve assembly and for delivery of lubricant to the working parts in the gear case, means for separating air and lubricant, a pump for returning the excess lubricant to the reservoir, and a nozzle for delivering the air and residual lubricant therein to power transmitting connections associated with the engine.

13. In a lubricating system for internal combustion engines of motorcycle type, the combination of a crank chamber provided with an elevated sump, a gear chamber provided with timing mechanism and an intake and exhaust valve assembly, of means for delivering lubricant from a source of supply under pressure to the crank and to the intake and exhaust valve assembly, a rotary valve driven from the timing mechanism in timed relation to the movements of the engine piston, said valve having a cavity in communication with the sump, a port adapted for communication with the valve assembly once during each revolution of the valve during the period of low pressure in the crank chamber, said valve and its casing being also ported for delivery of lubricant laden air from the sump to the timing mechanism during the periods of high pressure in the crank chamber.

14. The combination with the intake and exhaust valve assembly of an internal combustion engine, of means for delivering lubricant from a source of supply to the working parts in said assembly, means for utilizing crank case suction to withdraw excess lubricant from said assembly, distribute it to timing mechanism, and a pump for returning excess lubricant from said mechanism to the source of supply.

15. The combination with the intake and exhaust valve assembly of an internal combustion engine, of means for delivering lubricant from a source of supply to the working parts in said assembly, a gear chamber, and means for periodically extending crank case suction to said assembly to withdraw excess lubricant and subsequently distribute it in the gear chamber under pressure of air from the crank chamber during compression periods.

16. The combination with the intake and exhaust valve assembly of an internal combustion engine, of means for delivering lubricant from a source of supply to the working parts in said assembly, a gear chamber, a separating chamber having a distributing nozzle adapted to distribute lubricant laden air to power transmitting connections, means for utilizing crank case suction to withdraw lubricant from said assembly, said means being also adapted to subsequently utilize crank case compression to drive the withdrawn lubricant and air through the gear chamber and separating chamber, and a pump for returning excess lubricant to the source of supply.

17. The combination with an internal combustion engine, of intake and exhaust valve mechanism and a force feed lubricating system extending to the working parts of said mechanism and along the tappet rods on the return side, means for utilizing the piston suction to periodically aid withdrawal of lubricant along said tappet rods, and an engine driven valve for preventing a reverse flow of said lubricant during periods of compression in the crank chamber.

18. The combination with an internal combustion engine, of intake and exhaust valve mechanism and a force feed lubricating system extending to the working parts of said mechanism and along the tappet rods on the return side, and means for utilizing varying pressures in the crank case to deliver lubricant laden air from the crank case, to collect the lubricant returning along the tappet rods, mix it with lubricant laden air from the crank case, and distribute it to the engine timing mechanism and power transmitting connections.

19. In an internal combustion engine having a force feed lubricating system in communication with all parts subject to wear, the combination with feed and return pumps, of means for utilizing crank case suction and compression to facilitate collection and redistribution of lubricant from the force feed side of the system to the intake of the return pump.

20. In an internal combustion engine having a force feed circulatory lubricating system, the combination with a source of supply and feed and return pumps, of means for utilizing crank case suction and compression to facilitate collection and redistribution of lubricant from the force feed side of the system to the return pump, including means for reconditioning and cooling the lubricant preparatory to its recirculation.

21. In an internal combustion engine, the combination with an engine crank and fly wheel assembly, of a crank chamber having an elevated sump on the ascending side of the fly wheel, the wall of said chamber having a flange separating the chamber from the bottom portion of the sump and an overhanging scraping flange with an edge in close proximity to the fly wheel, and means for reconditioning and recirculating lubricant delivered to said pump.

22. In a motorcycle engine having a crank chamber, a gear chamber enclosing a cam shaft and timing gears, the combination of a crank shaft and fly wheel assembly in the crank chamber, the upper portion of the wall on the ascending side of the crank being provided with a sump into which lubricant may be thrown by centrifugal force, a power driven rotary hollow valve, said crank case having a drainage passage leading from the sump to the interior of said valve, whereby said valve may receive lubricant and air from the sump, said valve and its casing being ported to permit delivery and distribution of such lubricant and air at one stage of valve rotation to the cam shaft and associated gears.

23. In a motorcycle engine having a crank chamber, a gear chamber enclosing a cam shaft and timing gears, the combination of a crank shaft and fly wheel assembly in the crank chamber, the upper portion of the wall on the ascending side of the crank being provided with a sump into which lubricant may be thrown by centrifugal force, a power driven rotary hollow valve, located and ported to receive drainage from said sump, said valve and its casing being also ported for communication between its interior and the gear chamber during periods of compression in the crank chamber, whereby the lubricant and air received from the sump may be distributed to the mechanism in the gear chamber and prevented from returning to the crank chamber during periods of piston suction by rotation of the valve to a position interrupting communication with the gear chamber.

24. In an internal combustion engine having crank and gear chambers and a force feed lubricating system, the combination of a rotary valve controlling communication between said chambers during compression periods, and otherwise ported to receive excess lubricant from other portions of the engine during suction periods, and means for reconditioning and recirculating excess lubricant, including means for separating air and delivering it with a regulated content of lubricant to external power transmitting connections.

25. In an internal combustion engine lubricating system the combination with the crankcase, of a rotary controlling valve having inlet and outlet ports to receive and deliver lubricant from the crank case during periods of compression therein, and also ported to receive lubricant from other portions of the engine during periods of reduced pressure, said controlling valve being adapted to utilize compressed gases in the crank case to redistribute the lubricant to the timing gears and their bearings in the form of a spray.

26. In an internal combustion engine having a crank case and timing gear chamber, the combination therewith of a lubricating system including a rotary controlling valve having inlet and outlet ports to receive and deliver lubricant from the crank case during periods of compression therein, and also ported to receive lubricant from other portions of the engine during periods of reduced pressure, said valve having a screen interposed between its inlet and outlet ports, through which the collected lubricant may be blown to the timing gears during periods of crank case compression.

27. In an internal combustion engine having crank and gear chambers, the combination with such chambers of a lubricating system including a rotary controlling valve having inlet and outlet ports to receive and deliver lubricant from the crank case during periods of compression therein, and also ported to receive lubricant from other portions of the engine during periods of reduced pressure, said valve having a screen interposed between its inlet and outlet ports and having its outlet in communication with recirculating means across the contents of the gear chamber, whereby during periods of crank case compression the collected lubricant may be redistributed in the gear chamber in the form of a spray.

28. The combination with an internal combustion engine having crank and gear chambers and a valve mechanism, of a source of lubricant supply, engine driven pumping mechanism for delivering lubricant from the source of supply to the crank and valve assemblies, a controlling trap valve in the gear chamber having a lubricant collecting cavity open to the crank chamber, said valve having an outlet port open to the gear chamber in one position of the valve, and an inlet port adapted for communication with the valve assembly in another position of said valve, and engine driven means for adjusting the trap valve for a cycle of operations including withdrawal of lubricant from the valve assembly during periods of suction in the crank case, withdrawal of lubricant from the crank case during periods of crank case compression, and forcible delivery of such withdrawals to the gear case in the form of vapor and spray during periods of crank case compression.

29. The combination with an internal combustion engine having crank and gear chambers and a valve assembly, including valve actuating mechanism operatively connected with engine driven means in the gear chamber, of engine driven means for pumping lubricant to the crank and valve assembly bearings, and a cavitated trap valve adapted to utilize pressure variations in the crank chamber to withdraw excess lubricant from said bearings and spray it into the gear chamber.

30. The combination with an internal combustion engine having crank and gear chambers and a valve assembly, including valve actuating mechanism operatively connected with engine-driven means in the gear chamber, of engine driven means for pumping lubricant to the crank and valve assembly bearings, a cavitated trap valve adapted to utilize pressure variations in the crank chamber to withdraw excess lubricant from said bearings successively and spray it into the gear chamber, said trap valve being provided with a filtering screen through which the spray is delivered.

31. The combination with an internal combustion engine having crank and gear chambers and a valve assembly, including valve actuating mechanism operatively connected with engine driven gears in the gear chamber, of engine driven means for pumping lubricant to the crank and valve assembly bearings, a cavitated trap valve adapted to utilize pressure variations in the crank chamber to withdraw excess lubricant from said bearings and spray it into the gear chamber, said gear chamber having an associated purifying chamber and a suction duct adapted for communication with the trap valve during a portion of the period of low pressure in the crank case.

32. A lubricating system for internal combustion engines, including the combination with a source of lubricant supply, of a pump for distributing lubricant from the supply to the engine bearings exposed to crank case pressure variations, means for intermittingly utilizing pressure in the crank case to redistribute the lubricant to the timing mechanism, and means for separating air from the redistributed lubricant and returning the residual lubricant to the source of supply.

33. The combination with an internal combustion engine having intake and exhaust valve mechanism, of a force feed lubricating system extending to the working parts of said mechanism and provided with return passages along the tappet rods, of engine driven valve mechanism for subjecting said passages to piston suction exerted through the crank case during a portion of the suction period, and shutting off said passages from communication with the crank case during all other portions of the cycle of piston movement.

34. In a lubricating system for internal combustion engines having intake and exhaust valve mechanism, separate crank and gear chambers and a vented separating chamber in communication with the upper portion of the gear chamber, the combination therewith of power driven pumping means for delivering lubricant from a source of supply to the valve mechanism and crank chamber bearings, a power driven hollow trap valve having inlet ports for receiving excess lubricant from the crank chamber bearings and valve mechanism respectively, and also having an outlet port through which the received lubricant may be blown into the gear chamber during periods of compression in the crank chamber, said valve also having an inlet adapted in one position of the valve to open communication between the lower portion of the separating chamber and the valve cavity during periods of partial vacuum in the crank case, whereby to return separated lubricant to the valve cavity for redistribution to the gear chamber, the lower portion of the crank chamber being also connected for return of lubricant to the power driven pumping means.

35. In a lubricating system for internal combustion engines having separate crank and gear chambers, the combination therewith of power driven pumping mechanism for delivering liquid lubricant to the crank bearings, a power driven hollow trap valve for collecting air and excess lubricant from the crank chamber, a valve mechanism adapted for periodical delivery thereof to the gear chamber, connections for returning lubricant from the lower portion of the gear chamber to the pumping mechanism, and a separating chamber having an inlet connected with the upper portion of the gear chamber and also provided with a vented outlet leading from its upper portion, and an outlet for liquid lubricant connected with said trap valve, said trap valve having an inlet port for registry with the separating chamber connection during periods of partial vacuum in the crank case.

36. A motorcycle engine, having in combination a crank chamber subject to varying air and gas pressures in correspondence with piston movements and also having a gear chamber and an exterior reservoir for lubricant connected with the gear chamber by a pressure equalizing pipe, a pump for distributing lubricant from the reservoir to the engine bearings exposed to crank case pressure variations, means for intermittingly utilizing pressure in the crank case to deliver air, gases of combustion and excess lubricant to the gear chamber, and means for filtering and returning the lubricant to the reservoir, said gear chamber being provided with an outlet for delivery of said air and gases to the exterior.

WILLIAM S. HARLEY.

CERTIFICATE OF CORRECTION.

Patent No. 2,111,242.                                           March 15, 1938.

WILLIAM S. HARLEY.

It is hereby certified that error appears in the printed specification of the above numbered patent requiring correction as follows: Page 4, second column, line 75, claim 21, for the word "pump" read sump; and that the said Letters Patent should be read with this correction therein that the same may conform to the record of the case in the Patent Office.

Signed and sealed this 3d day of May, A. D. 1938.

(Seal)

Henry Van Arsdale,
Acting Commissioner of Patents.